No. 814,809. PATENTED MAR. 13, 1906.
N. S. SHELLY.
BRAN DISTRIBUTER.
APPLICATION FILED OCT. 5, 1905.

Witnesses
W. H. Ourand
L. E. Barkley.

Inventor
Nathan S. Shelly
by Frank S. Appleman
Attorney

UNITED STATES PATENT OFFICE.

NATHAN S. SHELLY, OF MANHEIM, PENNSYLVANIA.

BRAN-DISTRIBUTER.

No. 814,809.　　　　Specification of Letters Patent.　　　　Patented March 13, 1906.

Application filed October 5, 1905. Serial No. 281,478.

*To all whom it may concern:*

Be it known that I, NATHAN S. SHELLY, a citizen of the United States of America, residing at Manheim, in the county of Lancaster and State of Pennsylvania, have invented certain new and useful Improvements in Bran-Distributers, of which the following is a specification.

This invention relates to agricultural implements, and more particularly to a device for distributing bran at the base of plants, such as tobacco or the like, for the purpose of preventing the activity of cut-worms and injurious insects.

An object of this invention is to provide novel means for carrying bran and for discharging it at intervals, novel means being provided for permitting a discharge of the bran and for retaining the chute closed until a suitably-operated door is opened.

A further object of this invention is to provide a bran-distributer having suitable connection with the planting apparatus, whereby the bran-distributer is carried along with the planting apparatus, means being also provided for forcing the bran into the chute during the operation of the machinery.

Finally an object of this invention is to provide a device of the character noted possessing advantages in points of efficiency, simplicity, and durability, proving at the same time comparatively inexpensive to produce and maintain.

With the foregoing and other objects in view the invention consists in the details of construction and in the arrangement and combination of parts to be hereinafter more fully described and claimed.

In describing the invention in detail reference will be had to the accompanying drawings, forming part of this specification, wherein like characters denote corresponding parts in the several views, in which—

Figure 1:
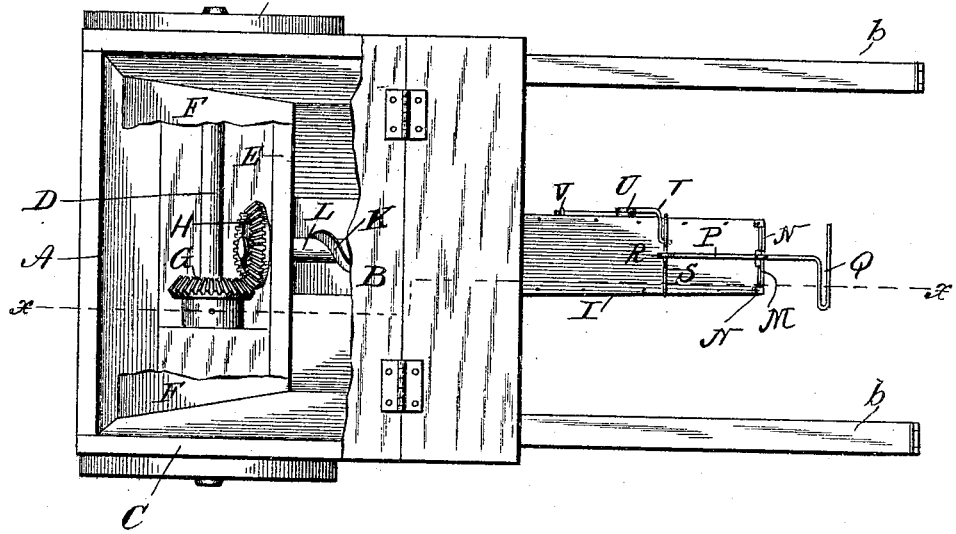
Figure 2:
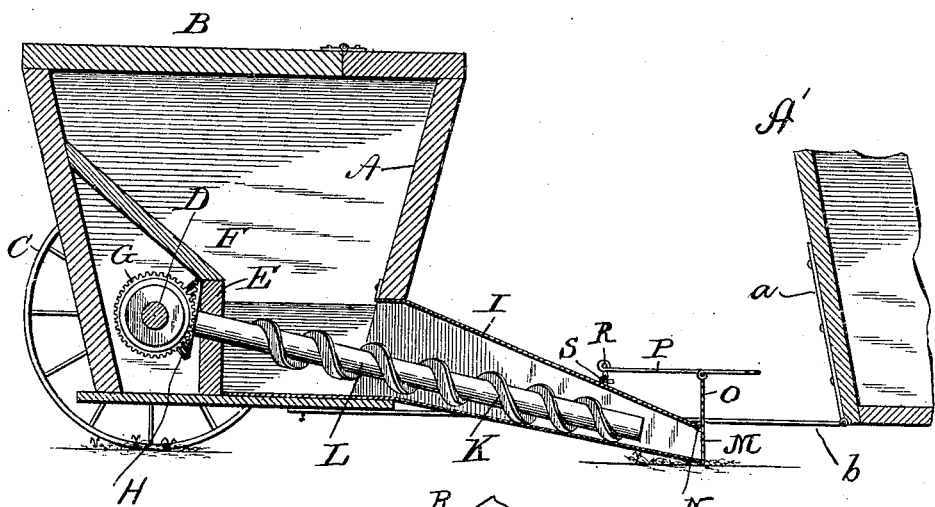
Figure 3:
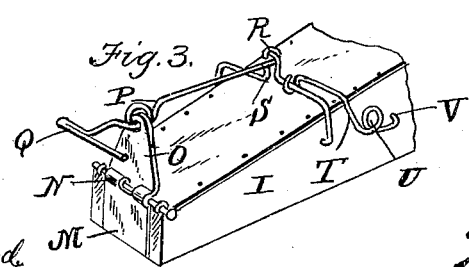

Figure 1 is a plan view of a bran-distributer with the top and a portion of the interior of the hopper broken away to show the operating mechanism. Fig. 2 is a sectional view on the line $x\,x$ of Fig. 1. Fig. 3 is a detail view of the door and its operating mechanism.

In the drawings, A indicates a suitable hopper having a door B in its top. The hopper is mounted on wheels C, which wheels support and rotate a shaft D, passing through the hopper. A compartment is formed in the hopper by means of the partitions E F, and the shaft D is confined within the compartment in order to prevent the bran from gaining access to the gearing G H, which is actuated by the shaft. A chute I extends from the front wall of the hopper and projects a suitable distance for the purpose of conveying the contents of the hopper as it is forced therefrom through the medium of the worm-blade K. The worm-blade is wound on a shaft L, which shaft has a bearing in the partition E and has on its inner end the gearing H, which takes motion from the gear-wheel G. As the machine is drawn over the ground the worm is rotated to feed the contents of the hopper into the chute, where it is banked against the door M, which closes the mouth of the chute. The door is hinged to the eyes N and has a portion O extending above the chute. The upper end of the door is provided with an eye in which the loop of an operating-rod P is secured. The outer end of the operating-rod is bent at right angles to the rod proper, as shown at Q, and the extremity of said rod is bent back on the portion Q to form a foot lying across the end of the rod. The inner end of the rod is formed into an eye R, which engages a rock-arm S, pivoted in the sides of the chute, and the said rock-arm is spring-pressed toward the end of the chute through the medium of the spring T, which has a coil U intermediate its length, while its end is anchored to the side of the chute, as shown at V. The spring, as stated, holds the rock-arm normally toward the end of the chute, thus projecting the rod in the same direction and tending to hold the door of the chute normally closed. When the foot of the rod is abutted, the door is opened to permit escape of bran, and when the pressure against the foot is removed the door is automatically closed.

A' denotes a fragment of a planting apparatus, and more particularly the rear portion thereof. Secured to the body of the planting apparatus is a plate or bracket $a$, to the lower end of which is hinged a connecting-rod $b$, which is secured at its opposite end to the under surface or bottom of the hopper A. It is the intention of the invention to have one of these rods $b$ at or near each side of the hopper A. These rods or "strips," as they may be termed, are flattened and are of certain resiliency, so as to permit of the motions or jars incident to travel of either the planting apparatus A' or the hopper A.

Having fully described my invention, what I claim as new, and desire to secure by Letters Patent, is—

1. In a device of the character described, a suitable hopper, suitable ground-wheels supporting the hopper, gearing driven by the movement of the ground-wheels, a worm actuated by the gearing, a chute into which the worm projects, said chute being in communication with the hopper, a trap-door at the end of the chute, said door having an extension above its pivots, a rod pivotally connected to the upper end of the trap-door, a rock-arm to which the inner end of the rod is connected and a spring to hold the rock-arm normally projected.

2. In a device of the character described, a suitable hopper, ground-wheels supporting the hopper, gearing within the hopper, means whereby the movement of the ground-wheels drives the gearing, a screw conveyer within the hopper, a chute into which the conveyer projects, a trap-door pivoted at the end of the chute, the upper end of said door projecting above the pivots, an operating-rod pivoted to the upper end of the door, the outer end of said rod having a foot adapted to be pressed to open the door, a rock-arm to which the inner end of the rod is pivoted, and a spring anchored to the side of the chute, and having an angular end bearing against the rock-arm to project the rod normally outward.

In testimony whereof I affix my signature, in the presence of two witnesses, this 25th day of September, 1905.

NATHAN S. SHELLY.

Witnesses:
A. G. HAMAKER,
CHAS. P. GIBBLE